Figure 1:
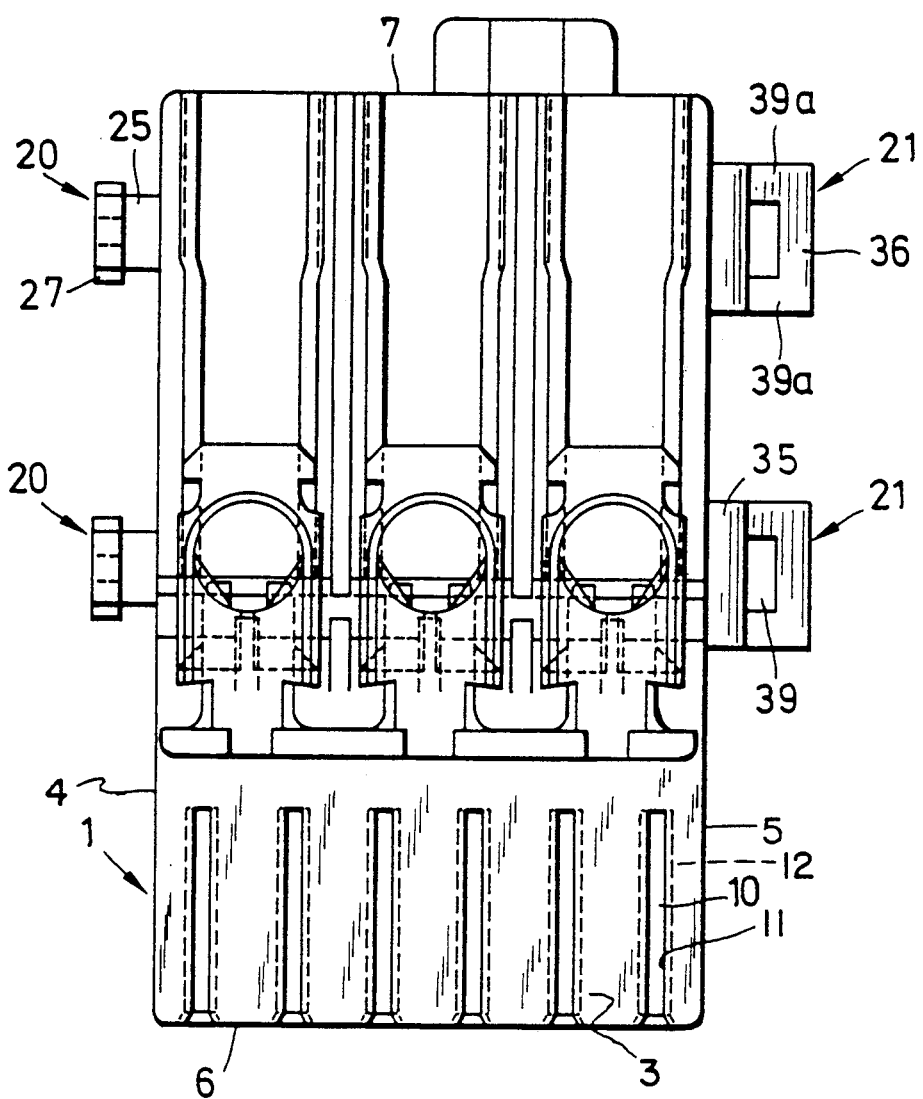

United States Patent [19]

Mantlik

[11] Patent Number: 4,998,893
[45] Date of Patent: Mar. 12, 1991

[54] PLASTIC CASING PROVIDED WITH CODING ELEMENTS FOR MACHINE PROCESSING

[75] Inventor: Konrad Mantlik, Wuppertal, Fed. Rep. of Germany

[73] Assignee: Grote & Hartmann GmbH & Co. KG, Wuppertal, Fed. Rep. of Germany

[21] Appl. No.: 430,767

[22] Filed: Nov. 2, 1989

[30] Foreign Application Priority Data

Nov. 9, 1988 [DE] Fed. Rep. of Germany ... 8814032[U]

[51] Int. Cl.⁵ ............................................ H01R 13/64
[52] U.S. Cl. ..................................... 439/488; 29/720; 439/681; 439/937
[58] Field of Search ............... 439/680, 681, 885, 937, 439/488; 206/228, 330, 820; 29/720, 747, 700, 701, 702, 703, 709, 747, 874, 884, 721

[56] References Cited

U.S. PATENT DOCUMENTS

| | | | |
|---|---|---|---|
| 3,241,658 | 3/1966 | Anderson | 206/820 |
| 3,449,813 | 6/1969 | Tregubenko | 29/701 |
| 3,614,711 | 10/1971 | Anderson | 439/314 |
| 4,190,890 | 2/1980 | Marx | 29/720 |
| 4,365,857 | 12/1982 | Watanabe et al. | 339/17 |
| 4,376,565 | 3/1983 | Bird et al. | 439/681 |
| 4,583,640 | 4/1986 | Gillan | 206/820 |
| 4,753,003 | 6/1988 | Gobeil | 206/330 |
| 4,813,892 | 3/1989 | Strate | 439/681 |

FOREIGN PATENT DOCUMENTS

| | | |
|---|---|---|
| 2050485 | 4/1971 | Fed. Rep. of Germany . |
| 2940457 | 4/1980 | Fed. Rep. of Germany . |
| 3417855 | 11/1985 | Fed. Rep. of Germany . |
| 3541610 | 5/1987 | Fed. Rep. of Germany . |
| 1514423 | 6/1978 | United Kingdom . |

Primary Examiner—Neil Abrams
Attorney, Agent, or Firm—Goodman & Teitelbaum

[57] ABSTRACT

A plastic casing for reception of electric contact elements which is suited for processing by machine, including coding elements for permitting the machine to recognize the electric contact elements present in the casing so that the casing can be properly assembled with a mating second casing to avoid assembling errors. The coding elements include grooves and coding pins, the grooves being provided in the first-mentioned casing. At least one of the coding pins being extractably inserted in a selected one of the grooves so that the presence and non-presence of the coding pins provides a predetermined code which is read by the machine. The coding arrangement can also be used to prevent incorrect mating of the casing with a plug.

15 Claims, 2 Drawing Sheets

PLASTIC CASING PROVIDED WITH CODING ELEMENTS FOR MACHINE PROCESSING

The present invention relates to a plastic casing outfittable by machine and provided with electric contact elements.

Electric contact elements are accommodated as a rule in plastic casings, which are then mounted in the corresponding apparatus or, for example, in a motor vehicle. In order to reduce the manufacturing expenditure and in order to unify the assembling conditions, frequently universal housings are used in which one casing can receive differing contact elements.

Such a casing has become known, for example, with Swiss patent No. CH-PS 468 069. This casing is meant for the reception of differing components and presents a plugging plate which is differently formed according to component. Further, this plugging plate presents connecting terminals which are adapted in respect to their number and their position to the particular component. This known device, however, can neither be assembled by machine, nor it is possible to further process it by machine after the installing of the electric comomponent. It is not possible, therefore, to use this known casing with resonable expenditure in modern large series production.

Underlying the present invention, therefore, is the problem of creating a plastic casing of the type mentioned at the outset, which is suited for processing by machine and in which, shortly before or after the outfitting a certain plugging face can be generated by machine.

This problem is solved according to the invention as set forth below where advantageous further developments of the invention are described.

Through the invention a plastic casing is created which in a simple manner can be equipped by machine with a certain program and can be recognized by machine. The plastic casing is fed to an outfitting machine, in which the contact elements required in each case are inserted into the casing. The machine provided for the further processing, such as, for example, a handling arrangement which installs the plastic casing in the corresponding apparatus, recognizes by the coding elements which contact elements are present in the casing. Thereby it is possible dependably to recognize the individual casings and to avoid errors in the assembling.

According to a preferable form of execution of the invention the coding elements are arranged in such a way that there is provided a binary-readable code. This can be achieved, for example, by the means that certain elements of the coding are present or not present. Through the alternation of "present" and "not present" there arises a binary code which can be read by the processing machine. If, for example, eight coding elements are present, then with these there can be set altogether 256 codings. If the variation is less, also fewer coding elements can be used; thus, for example, with five coding elements there are yielded a number of 32 variations, while with six coding elements there are 64 variations.

According to a further preferable form of execution of the invention, coding pins are used which are to be inserted in corresponding recesses in the casing or, if already inserted, are to be removed. The pins are then, for example, by the outfitting machine according to a predetermined code which informs of the variation of the contact elements, inserted in or extracted from the corresponding recesses.

In the further processing, then, the processing machine examines which pins are set, and therefrom, can recover the corresponding code.

According to a further form of execution to be preferred, the plastic casing is provided with arrangements which make it possible to assemble a large number of such casings together to form a casing belt. Thereby an exact spacing between the individual casings is achieved.

According to a further preferable form of execution of the invention the connection is brought about by snap-in elements which are arranged on two oppositely lying sides of the casing and which are complementarily formed in such a way that the first elements of one casing interact with the second elements of another casing. Through this connection the suitability of the plastic casing for machine processing is further improved, since now a large number of casings can be installed in the rolled-up state in the outfitting and processing machine.

A special formation of the snap-in elements, which leads to a dependable connection thereof with high holding strength and easy reading of the code elements, is described below.

Further features of the present invention are yielded from the following description of examples of execution in conjunction with the drawing.

Figure 2:
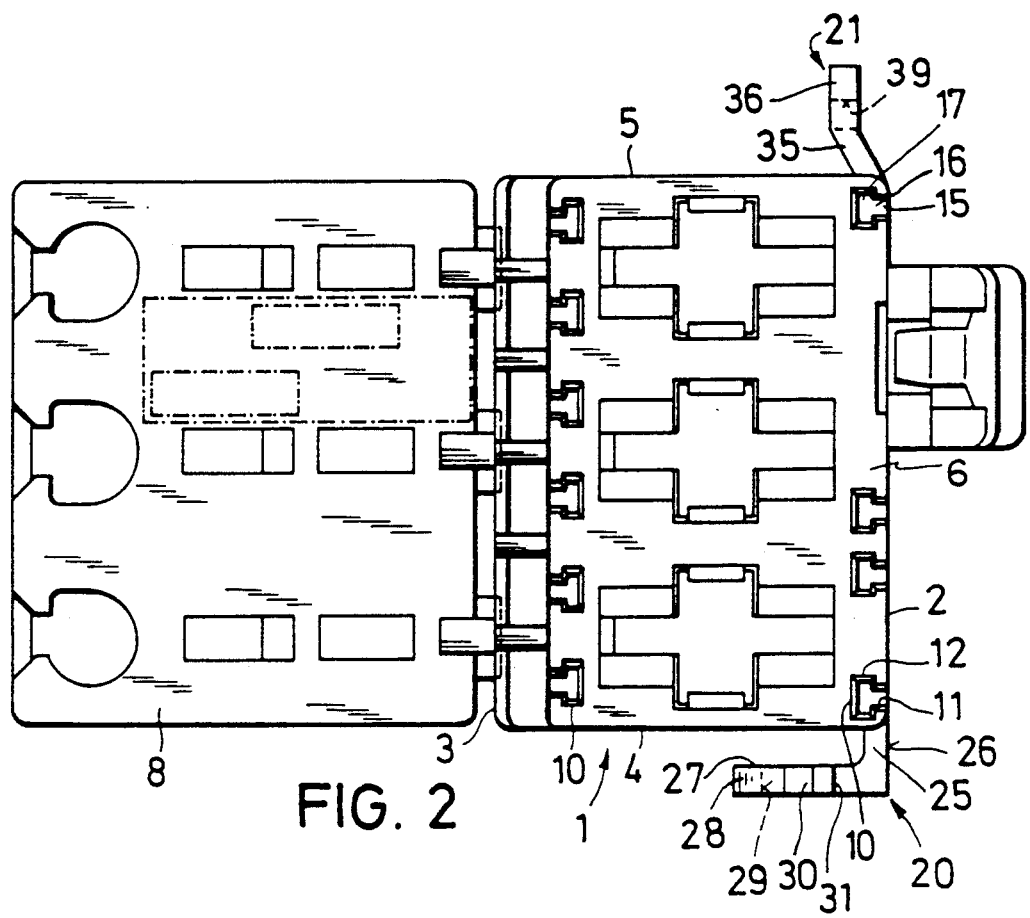
Figure 3:
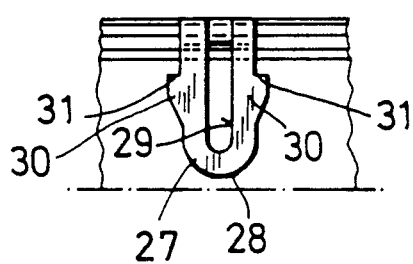

Herein:

FIG. 1 shows a plan view of a plastic casing according to the invention;

FIG. 2 a front view of the casing as viewed from the bottom of the showing of FIG. 1, and then being rotated 90° counter-clockwise therefrom;

FIG. 3 a detail view of a first element for joining individual casings together to form a belt.

A first example of execution of the invention is described in reference to FIGS. 1 to 3. The substantially slab-form plastic casing 1 includes a bottom wall 2, a cover wall 3, a left side wall 4, a right side wall 5, a front wall 6 and a back wall 7. A cover 8 is hingeably arranged on the cover wall and completes in the folded state the cover wall 3.

In the cover wall 3 and in the bottom wall 2, proceeding from the front wall 6, T-shaped cross-section grooves 10 are formed, the longitudinal axis of which runs parallel to the side walls 4, 5 and which extend perpendicular to the front wall 6. The grooves 10 present in each case an exactly defined spacing to one another and to the casing walls.

In the example of execution according to FIGS. 1 to 3 there are made six grooves in equal spacing to one another in each case in the cover wall 3 and four grooves with unequal spacing to one another in the bottom wall 2.

Each groove 10 is T-shaped and consists of narrow crosspiece opening 11, open to the cover wall or to the bottom wall, of rectangular cross section, and of a likewise rectangular, but broader beam cross-piece opening 12. The narrow opening 11 corresponds in its position to the vertical part of the letter "T", the broad opening 12 to the horizontal part of the letter "T" characterizing the cross section form.

Into the grooves 10 there are likewise slid, without play, T-shaped pins 15 which consist of a rectangular crosspiece 16 and of a rectangular crosspiece 17. The crosspiece 16 corresponds in its dimensions substantially to the narrow groove opening 11, the transverse piece 17 to the broad groove opening 12.

The pins 15 are slid from the outside of the casing into the grooves 11, whereby there is yielded the desired coding of the casing. It is also possible first of all to provide all the grooves with pins and then to remove the selected pins from the corresponding grooves.

The pins for the insertion into the grooves may consist of different materials. Thus, it is possible to use plastic pins, and to scan the presence of these pins in a corresponding manner. It is also possible, however, to use metal pins, whose presence then can be detected, for example, by means of inductive pickups.

In both cases the narrow groove opening 11 has the advantage that the presence of the pin can be checked from one side, which is possible mechanically and also visually.

The identification of the particular complement by the grooves 10 and the pins 15 can also be used for the purpose of making possible a correct joining thereof with a plug. The plug to be used has, for this purpose, pinlike projections which engage into the empty grooves in each case. If in such an arrangement, the plug projections and the empty grooves do not fit together whereby the plug cannot be slid into the associated groove, a wrong assembling thereof is dependably avoided.

The identification code can, for example, be constructed in such a way that the nonpresence of a pin in a groove 10 is interpreted with "zero" in a dual (binary) number system. The presence of a pin in the groove can then be interpreted with "one".

In this manner in the embodiment shown, in which ten plugging possibilities are provided, there can be displayed 1024 different codings.

It should be pointed out, however, that it is also possible to use the coding without inclusion of a binary number system. In this case in the example of execution shown there would then be ten possibilities for the insertion of the contact element in the grooves, in which the insertion of an individual pin into a certain position shows which contact elements are present in the casing.

The casing 1 of the present invention is provided with snap-in elements which make it possible to assemble each of the individual casings together, with an exactly defined spacing between one another, to form a casing belt.

The snap-in elements consist of two fingers 20 which project from the left side wall 4, and two lugs 21 which project from the right side wall 5.

The fingers 20 are formed by a crosspiece 25 which projects from the left side wall 4 and whose lower surface 26 aligns exactly with the outer surface of the bottom wall 2. From this crosspiece there extends a hook 27 upward at a right angle, i.e. parallel and at a spacing from the side wall 4. The hook 27 is rounded in semicircular arcuate form at its upper end 28 and has a recess 29 running in its longitudinal direction. On both sides of the hook 27 there is arranged a lug 30, which consists in each case of a widening thereof running symmetrically to the longitudinal direction of the hook, the downward-directed edge 31 of such widening runs perpendicular to the longitudinal axis.

The lugs 21 consist of a crosspiece 35 running obliquely upward from right side wall 5 and being adjacent to the bottom wall 2, and a plate 36 molded to the crosspiece 35 and running parallel to the lower surface of the bottom wall. In the plate 36 there is provided a rectangular recess 39. The recess 39 is dimensioned in such a way that the hook 27 of a second casing can be slide into the recess so that the lugs 30 of the hook 27 grip behind the crosspieces 39a formed on opposite sides of the recess 39.

By these snap-in elements constructed complementarily to one another there can be assembled together a large number of casing to form thereby a casing belt. By reason of the special construction of the snap-in elements which are constructed essentially directly as an extension of the bottom wall 2, these arrangements can be produced in a very simple manner. Further, a dependable connection of the casings is achieved, which assures that the casings cannot inadvertently be released from one another, which would lead to a standstill of the corresponding processing machine. Furthermore, through the special construction of the snap-in elements there is defined an exact spacing between the individual casings, which makes possible a specific machine arrangement for the reading of the coding in the casing belt.

I claim:

1. A plastic casing for receiving electric contact elements to be installed by machine in a corresponding apparatus, said casing comprising:
   coding means readable by the machine for determining number and arrangement of the electric contact elements in said casing to insure matching of said casing with the corresponding apparatus;
   said coding means including grooves provided in said casing and pins removably insertable in said grooves to provide a predetermined code determined by presence and non-presence of said pins in said grooves, so that presence of a first pin in a first groove provides one code information and non-presence of a second pin in a second groove provides another different code information;
   said grooves having a preselected spacing from each other and from walls of said casing; and
   said grooves being provided with wall means to removably secure said pins in said grooves so that said pins can only slide into and out of said grooves.

2. A plastic casing according to claim 1, wherein said casing includes a cover wall, a bottom wall opposite said cover wall, a front wall, a back wall and opposing side walls, said grooves being open longitudinally in at least one of said cover and bottom walls and running parallel to said side walls, said grooves extending to said front wall so that presence of said pins in said grooves can be visually checked.

3. A plastic casing according to claim 2, wherein said wall means include each of said grooves having a T-shaped construction in cross section, and each of said pins having a mating T-shaped construction in cross section, a vertical leg of each T-shaped groove being open to said at least one of said cover and bottom walls.

4. A plastic casing according to claim 3, wherein each T-shaped groove includes a narrow crosspiece opening having a rectangular cross section and a broader beam crosspiece opening perpendicular to said narrow crosspiece opening, said narrow crosspiece opening defining said vertical leg of each T-shaped groove, said narrow crosspiece opening being open to an outer surface of said at least one of said cover and bottom walls.

5. A plastic casing according to claim 4, wherein each of said T-shaped pins includes a rectangular crosspiece for mating with said narrow crosspiece opening of each T-shaped groove, and a rectangular transverse crosspiece for mating with said broader beam crosspiece opening of each T-shaped groove.

6. A plastic casing according to claim 1, wherein said grooves are constructed identical to each other.

7. A plastic casing according to claim 1, wherein said pins are fabricated from a metal material.

8. A plastic casing according to claim 1, wherein said pins are fabricated from a plastic material.

9. A plastic casing according to claim 1, wherein opposite first and second side walls of said casing are provided with snap-in means to join adjacent casings together in a side-by-side arrangement to form a casing belt in which said pins in said grooves can be visually checked so that said coding means can be read by the machine.

10. A plastic casing according to claim 9, wherein said snap-in means includes a first arrangement on said first side wall of said casing and a second arrangement on said second side wall of said casing, said first arrangement being constructed complementary to said second arrangement so that said first arrangement can be received in said second arrangement of an adjacent casing to form said casing belt.

11. A plastic casing according to claim 10, wherein said first arrangement includes a finger, and said second arrangement is provided with an opening for receiving said finger.

12. A plastic casing according to claim 11, wherein said finger includes a crosspiece extending perpendicularly from said first side wall of said casing, and a hook extending vertically upward from said finger crosspiece, said hook being positioned parallel to and spaced from said first side wall of said casing.

13. A plastic casing according to claim 12, wherein said hook is provided with a pair of lugs, said lugs being disposed on opposite sides of said hook for maintaining said hook in said opening of said second arrangement.

14. A plastic casing according to claim 12, wherein said second arrangement includes a crosspiece extending obliquely upward from said second side wall of said casing, and a plate extending from said second arrangement crosspiece in a position perpendicular to and spaced from said second side wall of said casing, said opening of said second arrangement being provided in said plate.

15. A plastic casing according to claim 14, wherein said finger crosspiece and said second arrangement crosspiece extend outwardly from a bottom wall of said casing so that said finger crosspiece is in alignment with said bottom wall and said plate of said second arrangement is offset and parallel to said bottom wall.

* * * * *